(12) United States Patent
Raad

(10) Patent No.: US 6,593,547 B1
(45) Date of Patent: Jul. 15, 2003

(54) AIR GAP DEICING DEVICE

(75) Inventor: Bernard A. Raad, Oxnard, CA (US)

(73) Assignee: Pacific Scientific Electro Kinetics Division, Carpenteria, CA (US)

( * ) Notice: Subject to any disclaimer, the term of this patent is extended or adjusted under 35 U.S.C. 154(b) by 0 days.

(21) Appl. No.: 09/998,067

(22) Filed: Nov. 30, 2001

Related U.S. Application Data
(60) Provisional application No. 60/250,714, filed on Nov. 30, 2000.

(51) Int. Cl.[7] .................................................. H05B 3/00
(52) U.S. Cl. ...................... 219/201; 219/202; 219/205; 219/209; 219/534; 392/347; 392/379
(58) Field of Search ................................ 219/201, 202, 219/205, 209, 522, 534, 535, 547, 494, 631; 310/85, 86, 89, 68 D; 392/347, 364, 379

(56) References Cited

U.S. PATENT DOCUMENTS

| | | | |
|---|---|---|---|
| 2,488,392 A | | 11/1949 | Forsyth |
| 3,183,975 A | | 5/1965 | Keen |
| 3,834,157 A | | 9/1974 | Hoffmann |
| 4,508,958 A | * | 4/1985 | Kan et al. .................... 392/364 |
| 4,661,734 A | * | 4/1987 | Capuano et al. ............ 219/209 |
| 4,667,781 A | * | 5/1987 | Lilley et al. ................ 219/201 |
| 4,678,881 A | * | 7/1987 | Griffith ........................ 219/631 |
| 4,747,748 A | | 5/1988 | Sahlberg |
| 4,797,590 A | * | 1/1989 | Raad et al. ................. 310/68 D |
| 4,982,123 A | * | 1/1991 | Raad .......................... 310/68 D |
| 5,167,488 A | | 12/1992 | Ciokajlo et al. |
| 5,191,254 A | * | 3/1993 | Raad et al. ................. 310/68 D |
| 5,281,091 A | | 1/1994 | Dooley et al. |
| 5,558,495 A | | 9/1996 | Parker et al. |
| 5,623,821 A | | 4/1997 | Bouiller et al. |
| 5,746,580 A | | 5/1998 | Parker et al. |
| 5,768,893 A | | 6/1998 | Hoshino et al. |
| 5,998,894 A | * | 12/1999 | Raad ............................. 310/89 |
| 6,082,963 A | | 7/2000 | Sexton et al. |
| 6,091,061 A | * | 7/2000 | Dreisler et al. ............. 219/494 |
| 6,106,229 A | | 8/2000 | Nikkanen et al. |
| 6,198,186 B1 | * | 3/2001 | Wallace et al. ............. 219/201 |

FOREIGN PATENT DOCUMENTS

JP 54114620 A 9/1979

* cited by examiner

Primary Examiner—Teresa Walberg
Assistant Examiner—Fadi H. Dahbour
(74) Attorney, Agent, or Firm—Barnes & Thornburg

(57) ABSTRACT

A deicer for an air gap between the rotor and stator of a rotating machine having a rotor and stator combination includes a heating assembly preferably disposed in the stator adjacent the air gap to heat the air in the air gap. Heating assembly includes an electrically powered resistive heating element wound through armature slots of the stator. The disclosed device and method have principal applications in emergency-type devices like Ram Air Turbines (RAT) and other power conversion devices such as Hydraulic Motor Generators (HMG) and Electric Motor Pumps (EMP).

15 Claims, 7 Drawing Sheets

AIR GAP DEICING DEVICE

This Application claims the benefit of Provisional Application No. 60/250,714, filed Nov. 30, 2000.

BACKGROUND

The present invention relates to rotating machines and more particularly to intermittent duty rotating machines having an air gap formed between a rotor and a stator within which ice may form.

The present invention provides an apparatus, system and method for preventing ice formation in an air gap between the rotor and stator of an intermittent duty rotating machine such as an electric generator, hydraulic pump or combination of the two devices for the production of power.

Modern aircraft typically include several types of primary power systems that are often driven by an aircraft engine during normal operation. These types of power include electrical, hydraulic and pneumatic, and are used to energize a variety of devices. Many modern multi-engine aircraft also feature emergency power systems for converting energy from one type to another, with a common one being driven by an air turbine, in the event the aircraft loses all or a significant portion of its electrical, hydraulic, or other type of power. The emergency power system is capable of deploying a ram air turbine (RAT) into the air stream surrounding the aircraft in flight. RATs are well known in the art and are disclosed in U.S. Pat. No. 5,746,580, issued May 5, 1998; U.S. Pat. No. 5,558,495, issued Sep. 24, 1996, the disclosures of which are incorporated herein by this reference. Even though all or a substantial portion of the electrical or hydraulic power has been lost, the RAT can still be deployed into the air stream to drive a rotating machine. The rotating machine produces the emergency power necessary to energize the central aircraft functions. This emergency energy is sufficient to retain some degree of control of the aircraft so long as essential control surfaces are still functional. Such rotating machines driven by a RAT include electric generators, hydraulic or pneumatic pumps or devices which combine all or portions of an electric generator and hydraulic or pneumatic pump. Even if the engines driving the primary power systems of the aircraft cease to operate, an emergency power system employing one or more RATs allows an aircraft having sufficient operable flight control surfaces to continue controlled flight with the purpose of seeking a safe landing.

Other devices exist, on board modern aircraft, which are used to convert energy from one form to the other, for the purpose of backing up primary systems. For instance, Hydraulic Motor Generators (HMGs) are used to generate electricity from hydraulic power, to provide an additional channel of electrical power should the generator driven by the main engine become inoperative. Another common application is to use Electric Motor Pumps (EMPs) to covert electrical energy to either hydraulic or pneumatic power. These devices comprise hydraulic or pneumatic pumps driven by electric motors, and are used in the event the engine-mounted devices become inoperative. These devices are mentioned herein because they are not driven by a RAT, but are still used for emergency power conversion.

Emergency power systems, by definition, are infrequently used. Emergency power systems are typically employed in situations in which the system is automatically or manually deployed. While modern aircraft are highly efficient and reliable, emergency power systems are necessary to provide an added degree of redundancy and thereby safety. Since the power system is infrequently, if ever, used under normal circumstances, it remains idle and non-functioning for extended periods of time. Nevertheless, the emergency power system must be able to perform without notice in the event of an emergency resulting from loss of the primary power systems. In such a situation, the emergency power system must go from a dormant condition to a fully operational condition in a few seconds.

It is while the emergency power system is in the dormant condition, i.e. under normal aircraft operating conditions, that potential problems might develop or occur. During normal operation, aircraft components are subjected to a wide range of temperatures and pressures. The ability of air to retain water in the form of water vapor (the saturation vapor pressure) is highly dependent on temperature and pressure. Air having a partial vapor pressure of water vapor below the saturation vapor pressure at one temperature and pressure, when subjected to lower temperatures and pressures may develop a partial vapor pressure of water vapor that would exceed the saturation vapor pressure of water vapor if the water remained in gaseous form inducing condensation of the water from vapor to a liquid. For example, when the aircraft is subjected to several flight cycles, under normal use, condensed water may develop within unventilated enclosures. In the event that condensed water develops, transition from an airport to flight elevation may cause the liquid to freeze. The development or accretion of ice is common in aircraft components during flight operations especially in small unventilated spaces which prevent the escape of moisture. Rotating machines of emergency power systems are typically designed to include such unventilated spaces between the rotor and stator to prevent solid contaminants from fouling operation.

Rotating machines, such as generators, turbines, motors and pumps, include an air gap defined by the space between the rotor and stator, which may be annular, conical, or axial, depending on machine configuration. Accretion of ice in the air gap between the rotor and a stator impairs the ability of the rotor to rotate relative to the stator and therefore, the ability of the rotating machine to generate power. Since the air gap is generally not easily ventilated, ice may form between these two components within the air gap as a result of condensation and subsequent freezing of water vapor from air trapped in the air gap. The ice may develop to a state where it impairs operation of the rotor and stator thereby preventing the generation of electricity, hydraulic pressure or pneumatic pressure by the rotating machine.

Different devices and methods for solving ice formation problems in turbomachinery have been conceived. Examples of such devices and methods are disclosed in U.S. Pat. No.: 5,746,580, issued May 5, 1998; U.S. Pat. No. 5,623,821, issued Apr. 29, 1997; U.S. Pat. No. 5,558,495, issued Sep. 24, 1996; U.S. Pat. No. 5,281,091, issued Jan. 25, 1994; U.S. Pat. No. 5,167,488, issued Dec. 1, 1992; U.S. Pat. No. 4,747,748, issued May 31, 1988; and U.S. Pat. No. 3,834,157 issued Sep. 10, 1974, the disclosures of which are incorporated herein for their teachings regarding turbomachinery.

Some additional prior deicing schemes have attempted to prevent ice formation by placing heating blankets wherever convenient within the cavity of a generator housing. Such heating blankets are disposed remotely from the rotor and stator. Such heating blankets are not placed within the air gap. The heating blanket is a form of heating element which is used to retrofit an emergency system. Because the heating blankets do not focus on the specific area requiring deicing, i.e. the air gap, they may not be thorough or efficient in removing ice. While this may provide acceptable results in some situations, it is desirable to further reduce the possibility of ice formation and to eliminate ice in the event it has already formed.

An air gap deicing device for use with a rotating machine having a stationary stator separated by an air gap from a rotating rotor rotating about an axis of rotation extending therethrough in an axial direction in accordance with one aspect of the disclosure includes a heating element and a thermally conductive shield disposed between the heating element and the air gap. The heating element is disposed in at least one of the rotor and stator adjacent the air gap. The deicing device may also include a thermal shield disposed between the heating element and a portion of the one of the rotor and stator. Additionally, if the one of the rotor and stator is formed to include a plurality of apertures extending therethrough in the axial direction, the heating element may extend through the plurality of apertures. Heating element may be an electrical resistive heating element.

A rotating machine in accordance with another aspect of the disclosure includes a stator, a rotor configured for rotational movement relative to stator and separated from stator by an air gap, and an electrically resistive heating element disposed in one of the stator and rotor in thermal communication with the air gap. The machine may also include a thermal shield disposed between the heating element and portions of the one of the rotor and stator separated from the air gap by the heating element. Additionally, the rotating machine may include a thermally conductive element in thermal communication with the heating element and disposed between the heating element and the air gap.

A method of inhibiting ice formation in a rotating machine in accordance with an aspect of the disclosure includes the steps of providing a rotating machine having coaxially arranged rotor/stator combination including a rotor and a stator defining an air gap therebetween, providing an electrically powered resistive heater, disposing the provided resistive heater within one of the rotor and stator adjacent the air gap, energizing the provided resistive heater. A temperature sensor may be provided adjacent the air gap to sense the temperature of air in the air gap so that the resistive heater is energized when the sensed temperature is at or below a selected limit and de-energized when the sensed temperature is above the selected limit.

Additional features and advantages of the invention will become apparent to those skilled in the art upon a consideration of the following detailed description of a preferred embodiment exemplifying the best mode of carrying out the invention as presently perceived.

DESCRIPTION OF THE DRAWINGS

The detailed description particularly refers to the accompanying figures in which.

DETAILED DESCRIPTION

Figure 1:
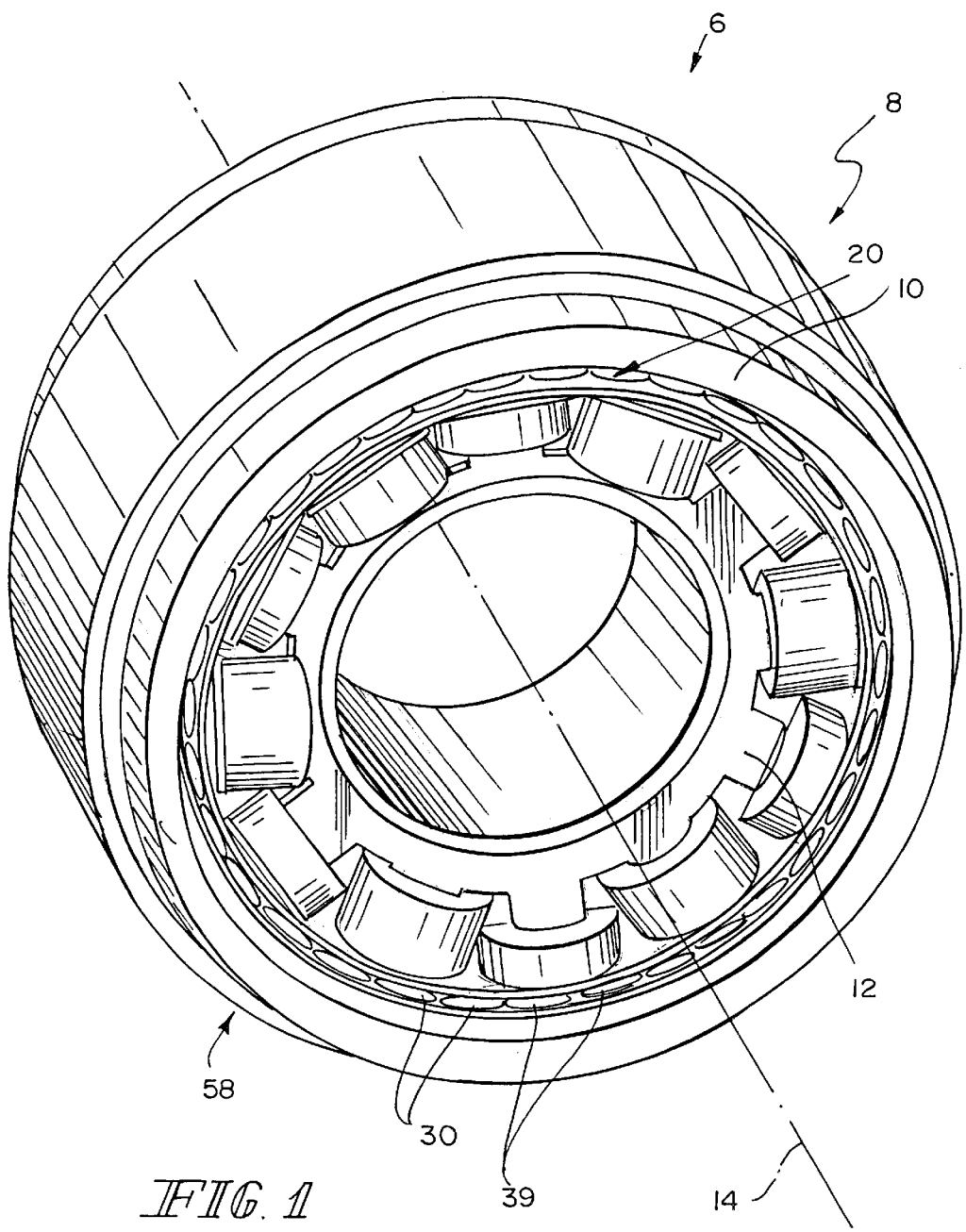
FIG. 1 shows a perspective view of a main stator and rotor combination with other elements of the generator omitted.
Figure 2:
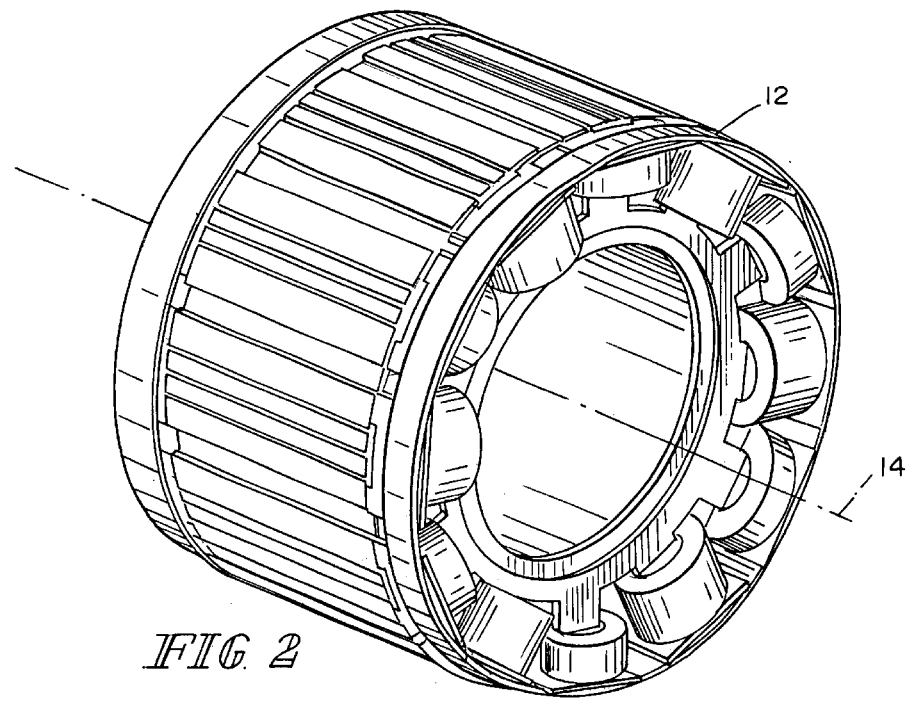
FIG. 2 is a perspective view of the rotor removed from the stator.

The invention disclosed herein includes a device, system or method for preventing and eliminating the formation of ice in a rotating machine 6. As shown, for example, in FIG. 8, rotating machine 6 may include a generator 58 or a hydraulic pump 56 driven by a turbine 60 of a RAT. As shown, for example in FIG. 1, rotating machine 6 includes a rotor/stator combination 8 with an air gap 20 defined in an annular space between a stator 10 and a rotor 12 of the combination 8. While shown in FIG. 8 as being discrete devices driven by separate turbines 60, hydraulic pump 56 and generator 58 may be discrete devices driven by a single turbine or be a combination rotary machine capable of generating electrical power and hydraulic pressure driven by a single turbine. In the illustrated embodiment, deicing assembly 30, during normal aircraft operation, is powered by the generator 62 of an aircraft's primary power system 64 that also powers the aircraft electrical systems 66. The illustrated primary power system 64 also includes a hydraulic pump 68 that provides pressurized hydraulic fluid to aircraft hydraulic systems 70. Illustratively, primary power system 64 is driven by a shaft extending from a turbine 72 representing an aircraft engine. Additional switches and valves facilitating the transition from the primary power system to the emergency power system are not shown.

Figure 4:
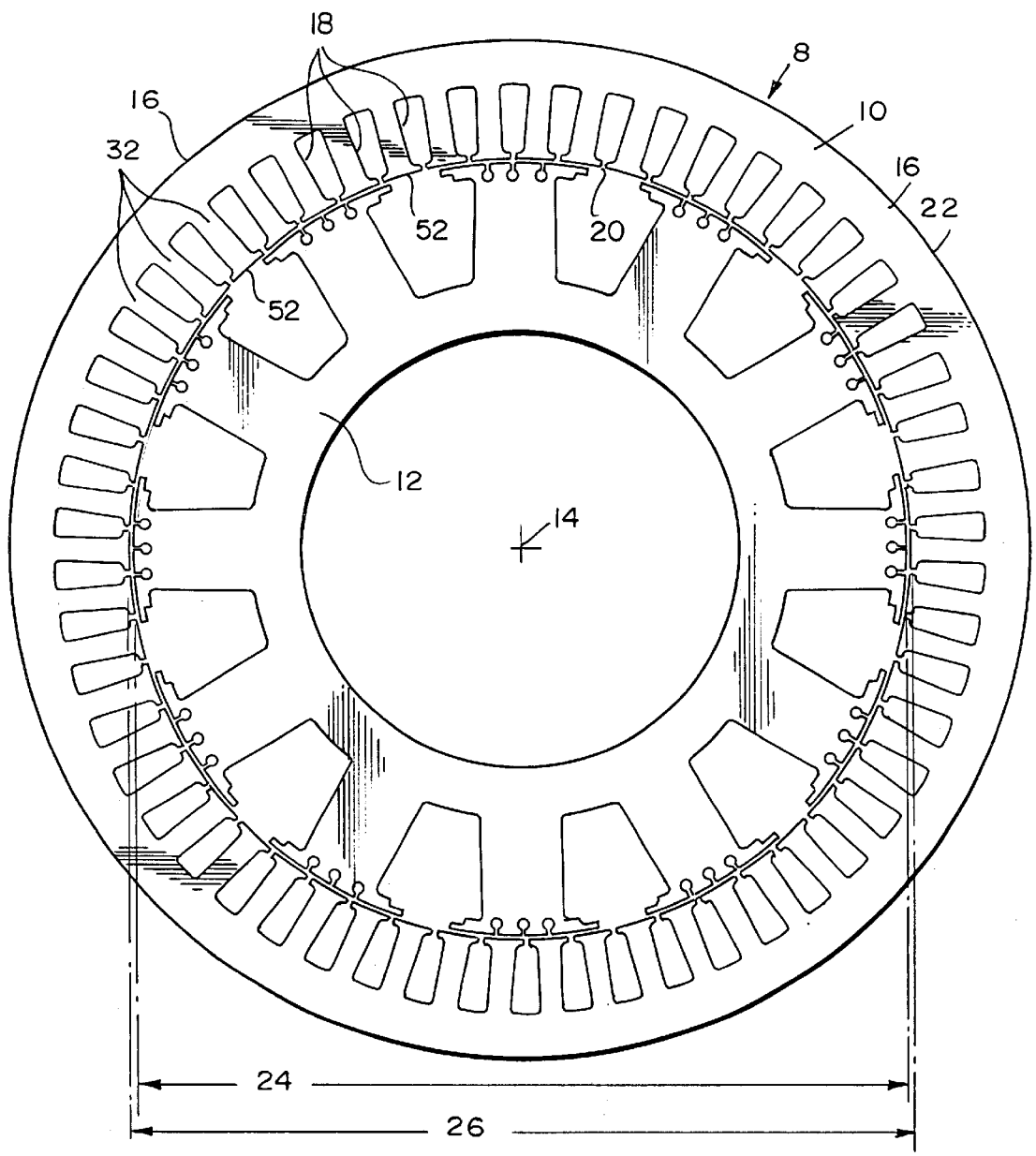
FIG. 4 is a plan view of the rotor and stator only in their respective relationship to each other.
Figure 8:
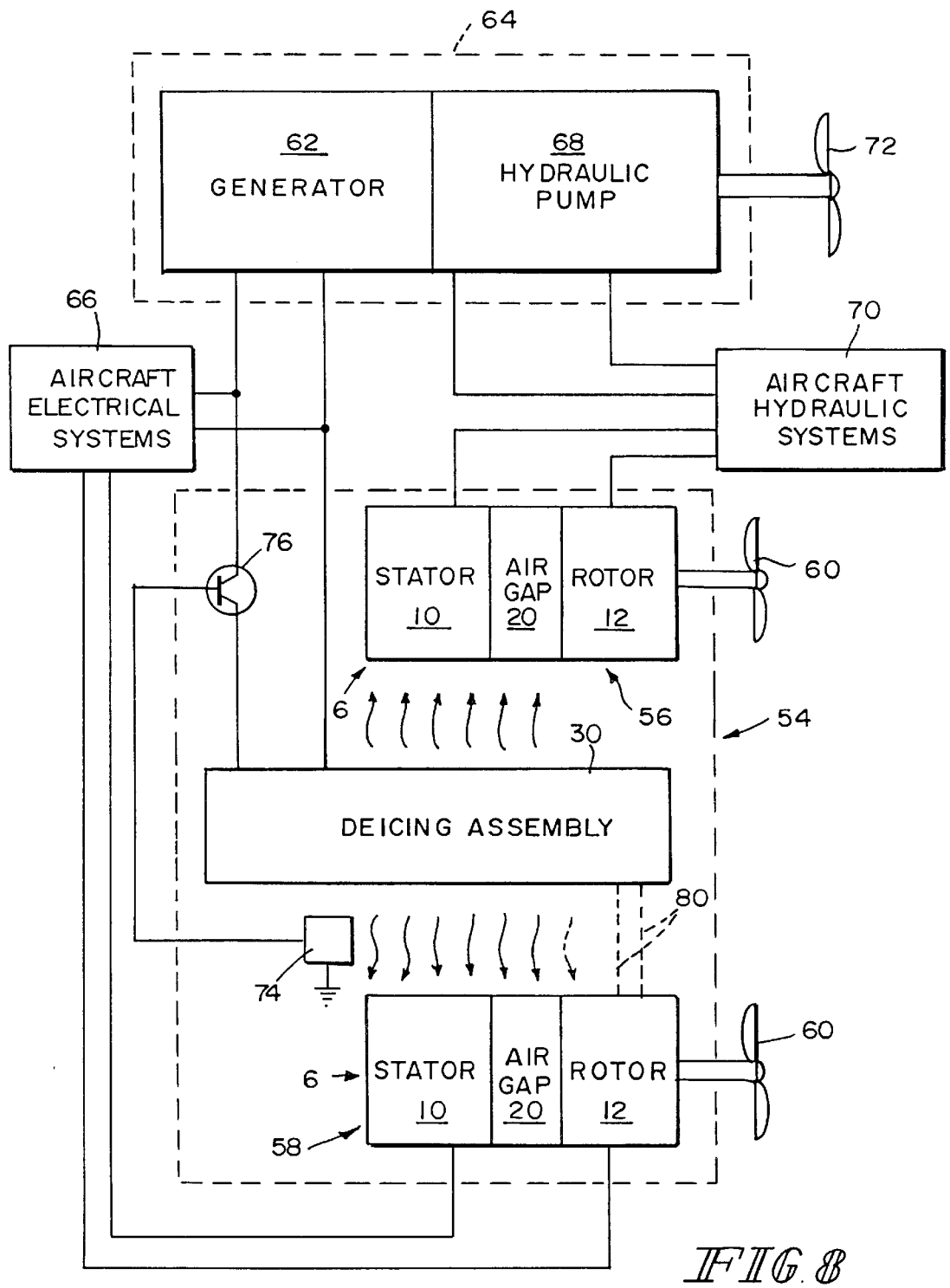
FIG. 8 is a diagrammatic view of an aircraft's primary power system for generating electrical power and hydraulic power to drive aircraft electrical and hydraulic systems, respectively, during normal operation and an emergency power system including a generator and hydraulic pump driven by a ram air turbine to provide electrical and hydraulic power to aircraft electrical and hydraulic systems, respectively, during emergency operation.

As shown, for example, in FIGS. 1 and 4, rotor 12 is disposed coaxially within stator 10 for rotational movement with respect to stator 12. An outside diameter 24 of rotor 12 is smaller than an inside diameter 26 of stator 10. Thus the adjacent surfaces of rotor 12 and stator 10 define air gap 20. Air gap 20 between the outside diameter 24 and inside diameter 26 allows for a degree of movement of the components. The rotor/stator combination 8 is a common component used in aircraft-type rotating machines for power generation such as hydraulic fluid pumps and electrical generators. Electrical generators with which the teachings of this disclosure may be applied include devices featuring a 3-generators-in-1, comprising a main generator 58, the rotor/stator combination 8 of which is shown in the drawings, an exciter generator (not shown), and a permanent magnet generator (PMG) (not shown). While FIG. 8 illustrates both hydraulic pump 56 and generator 58 and the description hereinafter is limited to electrical generator 58, those skilled in the art will recognize that the teachings of the disclosure also apply to other rotating machines such as hydraulic pumps, turbines, motors, pumps and the like. Also, while the illustrated embodiment includes an annular air gap between the rotor and stator, it is within the teaching of the disclosure for the air gap to be other shapes such as conical or axial based on the configuration of the rotating machine.

Deicing assembly 30 is positioned in close proximity to air gap 20 so that heat can be transferred from deicing assembly 30 to air gap 20. Deicing assembly 30 thus heats the air trapped within air gap 20 and the surfaces of the rotor and stator adjacent air gap 20. Since the air in air gap 20 is heated by deicing assembly 30, more water can be retained by the heated air in the form of water vapor without exceeding the saturation vapor pressure than could be retained by unheated air. Thus, the humidity level of the heated air will preferably remain below 100% relative humidity. Since the rotor and stator surfaces adjacent air gap 20 are heated, condensation of water vapor on these surfaces is inhibited. To the extent that water vapor within the heated air does condense on the rotor and stator surfaces, the water is convectively heated to inhibit freezing and accumulation of ice within air gap 20. The heating of water condensed on the surfaces of the rotor and stator also facilitates evaporation of the water. By preventing the accumulation of moisture therein, ice will be prevented from forming. Should ice nevertheless temporarily form on the surfaces of rotor 12 or stator 10 adjacent air gap 20, the heated surfaces will facilitate melting of the ice. Once the ice melts, the heated surfaces and the heated air will facilitate evaporation of the water.

Illustratively, deicing assembly 30 is activated when a predetermined temperature or range of temperatures is sensed in close proximity to rotor/stator combination 8. For example, if a temperature sensor 74 senses that the temperature is below 40 degrees Fahrenheit, switch 76 will be closed and deicing assembly 30 will be activated thereby preventing the accretion of ice in air gap 20.

Those skilled in the art will recognize that different threshold temperatures may be chosen for activation of deicing assembly 30 or that deicing assembly 30 may be constantly activated during aircraft operation within the teaching of the disclosure. Additionally, some of the power generated by emergency generator 58 may power deicing assembly 30 during emergency operation as shown by phantom lines 80 in FIG. 8. It is also within the teaching of the disclosure for power to be supplied to deicing assembly 30 by batteries (not shown) or any other electrical power source during normal and/or emergency operation.

One of ordinary skill in the art will understand and appreciate the aircraft-type generator 58 such as that disclosed herein and will be able to apply the teachings of this disclosure to such an aircraft-type generator 58. It will also be appreciated that the deicing assembly may be applied to any electric or hydraulic rotating machine 6, such as turbines, motors, and other pumps and devices in which ice accretion may occur because of intermittent nature of use or other conditions. It will also be understood that the deicing assembly as disclosed herein is but a component of the aircraft-type generator 58 or other rotating machine 6. In this regard, in the interest of clarity supporting elements such as housings, shafts and bearings have been omitted from the figures. Illustratively, generator 58 is a synchronous electromechanical machine. Those skilled in the art will also recognize that the theory of operation described, while believed to accurately reflect the operation of the assembly 30, should not limit the scope of the invention described herein. Additionally, while being described as inhibiting condensation and subsequent freezing of water vapor, it is within the teaching of the disclosure that assembly inhibits sublimation of water vapor.

By activating deicing assembly 30 at a desired temperature or range of temperatures the formation of ice in air gap 20 can be prevented thereby allowing rotating machine 6 to operate when necessary. As noted hereinabove, this is an important consideration when rotating machine 6 is used in an emergency power system 54. Of course, it will be appreciated by those individuals familiar with such systems and rotating machines 6 that the present invention has application beyond use in combination with an emergency power system 54.

It should also be noted in its broad application that deicing assembly 30 can be provided on rotor 12 instead of being limited to being provided only on stator 10. Additionally, heating elements can be provided on both the rotor 12 and stator 10 to provide system redundancy. In situations in which deicing assembly 30 is mounted on rotor 12, one of ordinary skill in the art will appreciate that conductive slip rings, commutators and brushes, or similar electrical coupling devices, including but not limited to inductive devices such as transformers, must be used to provide energy to deicing assembly 30 attached to rotor 12. This is due to the fact that rotor 12 rotates within stator 10 and as such an electrical coupling must be used to provide power from stationary stator 10 to moving rotor 12.

The location of deicing assembly 30 of the present invention provides an efficient heating device, system and method for heating and deicing air gap 20. Placement of the deicing assembly 30 in close proximity to air gap 20 helps to maximize the energy transfer for its intended purpose, i.e. heating and deicing air gap 20 and surfaces adjacent thereto, as opposed to heating the surrounding structures. By positioning the deicing assembly 30 in close proximity to air gap 20, and directing the heat energy toward air gap 20, potential adverse heating effects of deicing assembly 30 relative to other components within the system is prevented.

As previously discussed, the invention includes several embodiments including a deicing device or assembly 30 which can be installed in a rotor/stator combination 8, a rotor/stator combination 8 employing deicing assembly 30 and a method for heating an air gap 20 between a rotor/stator combination 8.

Deicing assembly 30 in accordance with an illustrated embodiment of the invention is shown, for example, in FIGS. 1–7. Deicing assembly 30 is used in conjunction with a rotating machine 6 having a rotor/stator combination 8 including stator 10 and rotor 12 with air gap 20 extending therebetween. Illustratively, rotating machine 6 is a generator 58, however, deicing assembly 30 may be used with other rotating machines 6 within the teaching of this disclosure. In the illustrated embodiment stator 10 and rotor 12 are mounted coaxially about longitudinal axis 14 extending in an axial direction through rotor 12 and stator 10 and about which rotor 12 rotates.

As shown, for example, in FIGS. 4–7, stator 10 includes a stator core 16 and a winding assembly 28. Winding assembly 28 is not shown in FIG. 4 and shown only in one armature slot 18 in FIGS. 5–7 for clarity of illustration. Those skilled in the art will recognize that winding assembly 28 is wound through each armature slot 18 and around each arm 32 in generator 58. Stator core 16 includes a plurality of arms 32 extending radially inward from a continuous outer ring-shaped body 22. Each side wall 42 of each arm 32 also extends radially inward from body 22 along a substantial portion of its length. At the inner end of each arm 32, a finger 46 is formed extending laterally toward the adjacent arm 32. Internal wall or angled surfaces 44 of fingers 46, side walls 42 of arms 32 and the internal wall 50 of ring-shaped body 22 cooperate to define a plurality of armature slots 18. The side walls 42 of arms 32 are formed to include laterally-extending fingers 46 that define a plurality of axially-extending gaps 48 each of which is located between adjacent arms 32. The interior walls 52 of the plurality of arms 32 can be viewed as forming a segmented interior wall of stator 10 which is adjacent air gap 20. Similarly the interior walls 52 of arms 32 can be viewed as forming an interior wall of stator 10 with a plurality of axially-extending gaps 48 extending therethrough to provide communication between air gap 20 and armature slots 18. Segmented interior wall of stator 10 has a generally circular cross section, as shown, for example, in FIG. 4.

Figure 5:
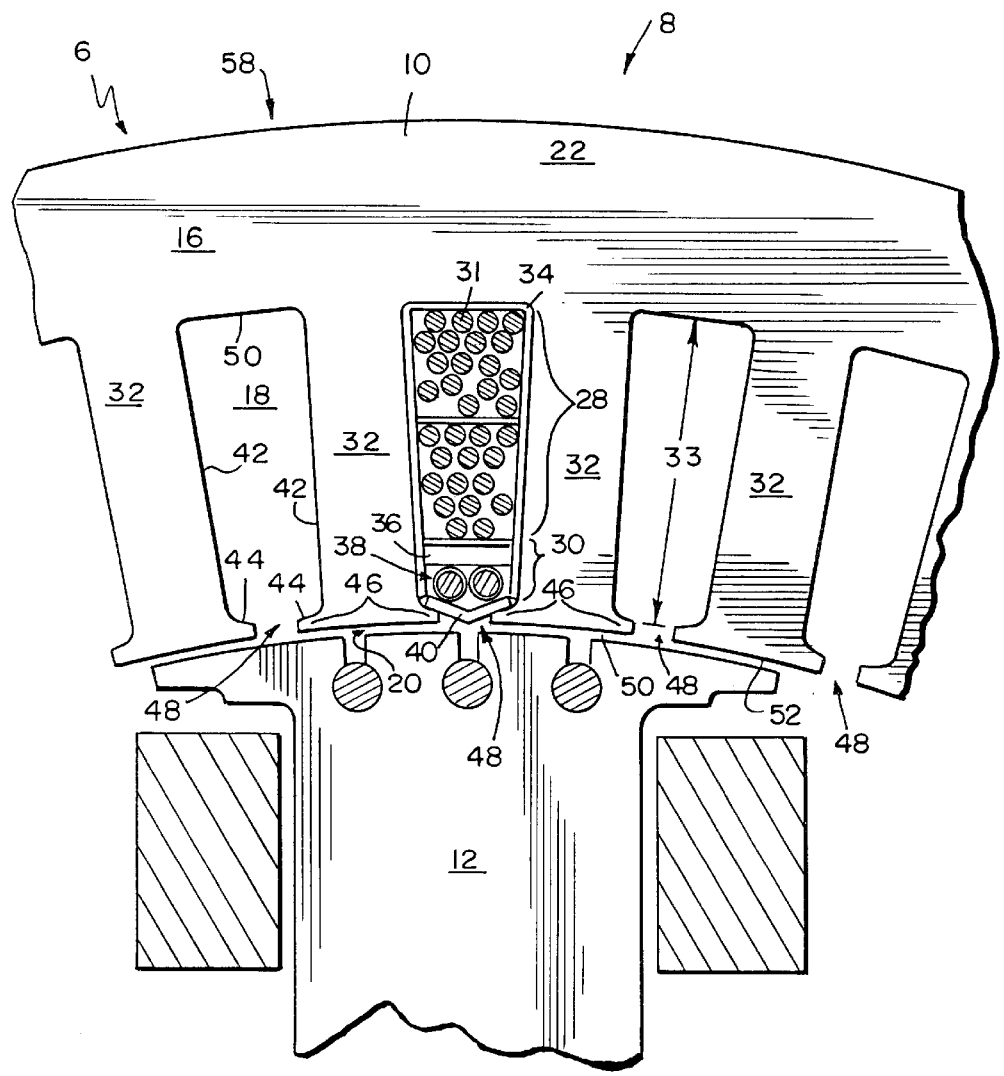
FIG. 5 is an enlarged view of one section of the stator and rotor of FIG. 4, with a winding assembly, an insulative sleeve, a heater coil and a retainer positioned in one armature slot of the stator.
Figure 6:
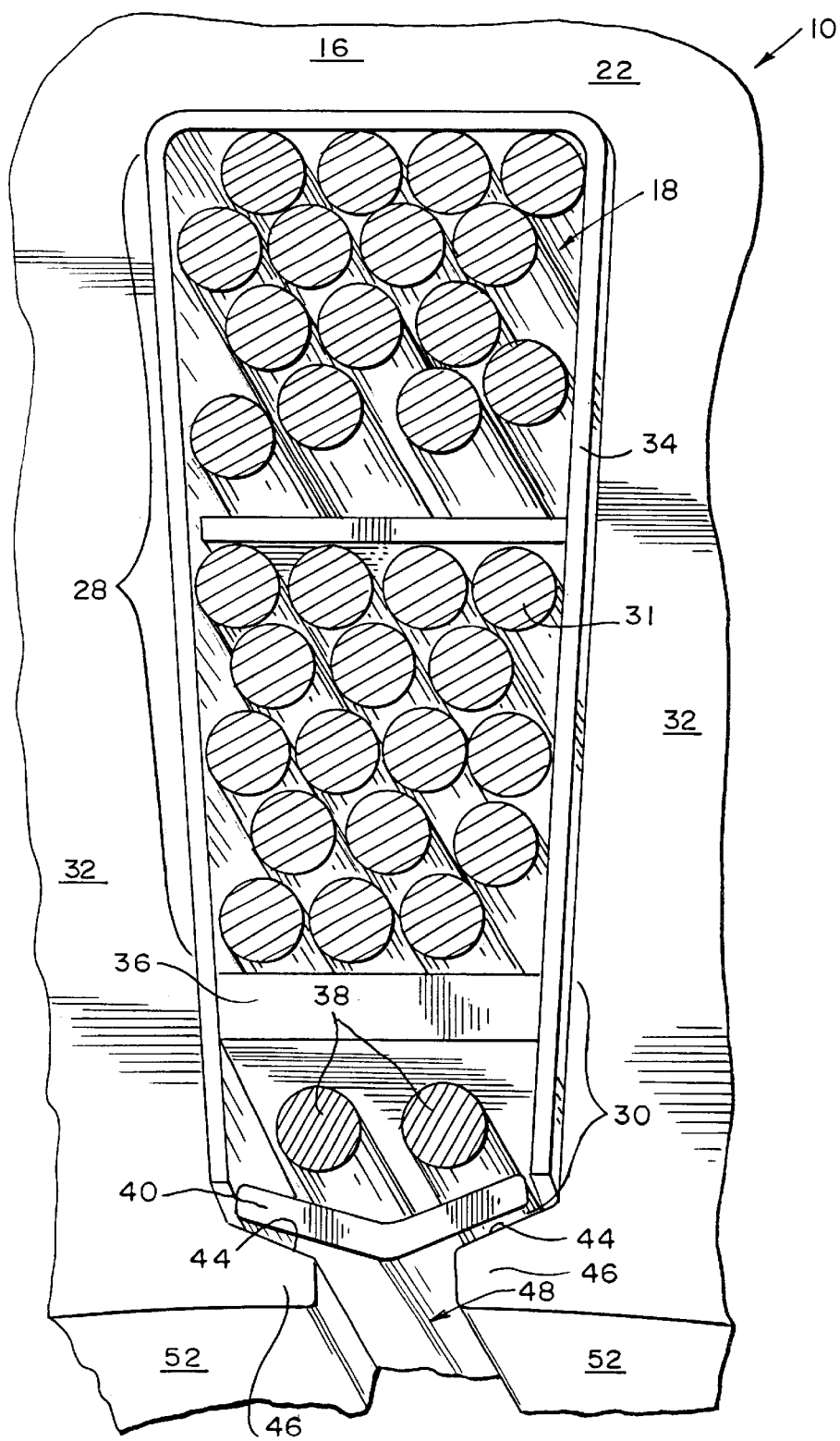
FIG. 6 is an enlarged perspective view of the section as shown in FIG. 5.

As shown in FIG. 5, winding assembly 28 of stator 10 is positioned within armature slot 18 defined therein. When cut in cross-section, winding assembly 28 appears to comprise a plurality of conductive wires 31. Those skilled in the art will recognize that conductive wires 31 may be a single conductive wire 31 repeatedly wrapped about adjacent armature arms 32 to extend through adjacent armature slots 18 or a plurality of such conductive wires. Conductive wires 31 are bundled and wrapped around neighboring arms 32 defined between two neighboring armature slots 18. Each armature slot 18 extends axially through stator 10 and includes a radial length 33 and lateral width. Lateral width varies as the length of the chord subtended by the angle formed by the radially-extending side walls 42 of arms 32 increases based upon the displacement from axis 14.

Illustratively, stator 10 is formed to include a plurality of axially-extending gaps 48 extending from armature slots 18 through interior surface of stator 10. Radial length 33 of the armature slot 18 is sufficient to accommodate heating assembly 30 in addition to winding assembly 28. Armature slot 18 also includes a liner 34 formed of a material such as Nomex which provides insulation between stator arm 32 and conductive wires 31 of winding assembly 28 serving to electrically isolate winding assembly 28 from stator core 16.

Deicing assembly 30 includes a shield 36, one or more heater wires or resistance heating elements 38 and a retaining device 40. These components are positioned within a forward area of armature slot 18 between winding assembly 28 and interior surface 52 of stator 10.

Shield 36 is formed of a material which is thermally and electrically resistive. The thermally and electrically resistive shield 36 is disposed between winding assembly 28 and heating elements 28 to physically, electrically and thermally isolate heating elements 38 from winding assembly 28. This protects the winding assembly 28. Wires 31 of winding assembly 28 have an insulating layer on the outside thereof and the absence of shield 36 might result in thermal and mechanical degradation and shortened life of the insulation on wires 31. Shield 36 is formed of a material such as fiberglass, PEEK (Polyetheretherketone) or any other suitable high temperature dielectric material which has thermal and electrical insulating capabilities. Alternatively, if necessary to achieve different packaging or dimensional restraints, multiple materials may be used to form shield 36 such as a material which has increased thermal resistivity in combination with another material which, although it is not as thermally resistive, might be more electrically resistant than the thermally insulating material.

Retainer 40 is also a form of shield which is thermally conductive but electrically resistive. Retainer 40 is disposed between heating elements 38 and the axially extending gap 48 extending through interior wall 52 of stator 10 providing communication between armature slot 18 and air gap 20. Retainer 40 retains heating elements 38 within armature slot 18. Retainer 40 is thermally conductive to efficiently conduct heat away from heating elements 38 towards air gap 20. While retainer 40 is shown in a wedge shape, it need not be formed in this shape. As shown in the present figures, the wedge shape derives from the angled surfaces 44 on fingers 46 and the axially-extending gap 48 between adjacent fingers 46. The surfaces 44 are angled toward the gap 48 so as to have a reducing effect on leakage between neighboring fingers 46 across the gap 48. The retainer 40 is formed of a suitable material such as aluminum oxide ceramic material. While other materials such as beryllium oxide may be used, such materials are more difficult to work with and require more controls in fabrication and assembly. As such, materials such as aluminum oxide ceramic material provide a sufficient balance of ease of manufacturing and assembly in combination with thermally conductive and electrically resistive properties.

Figure 3:
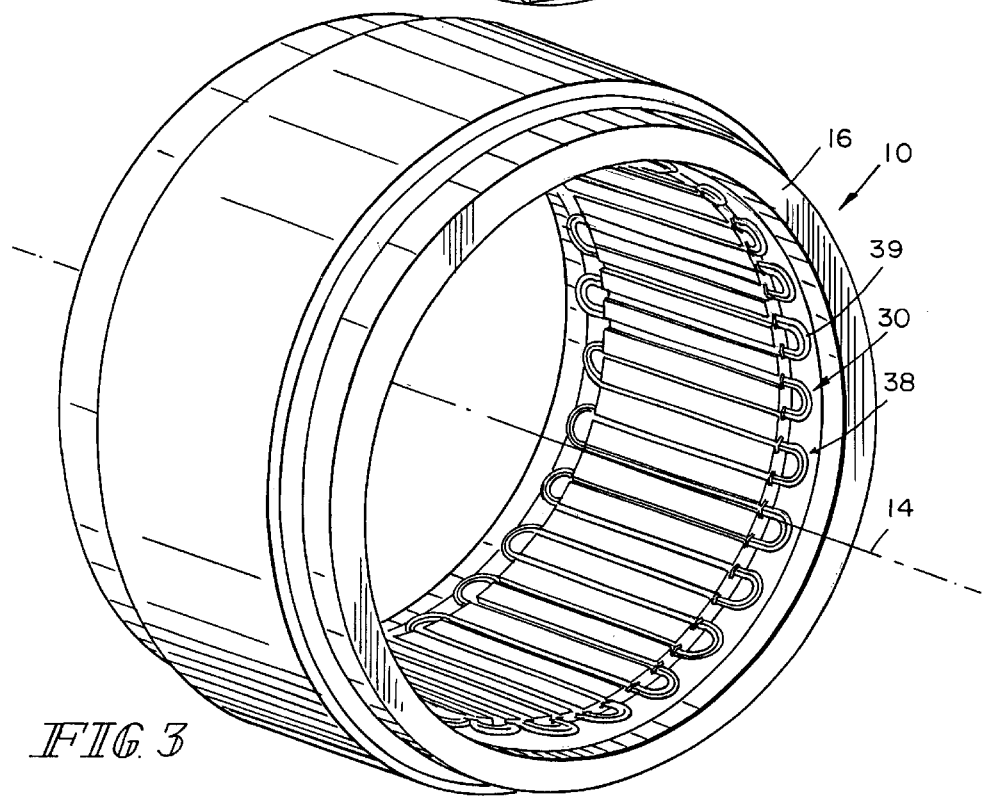
FIG. 3 is a perspective view of the stator including a heating element wound within armatures positioned in the periphery of the stator.
Figure 7:
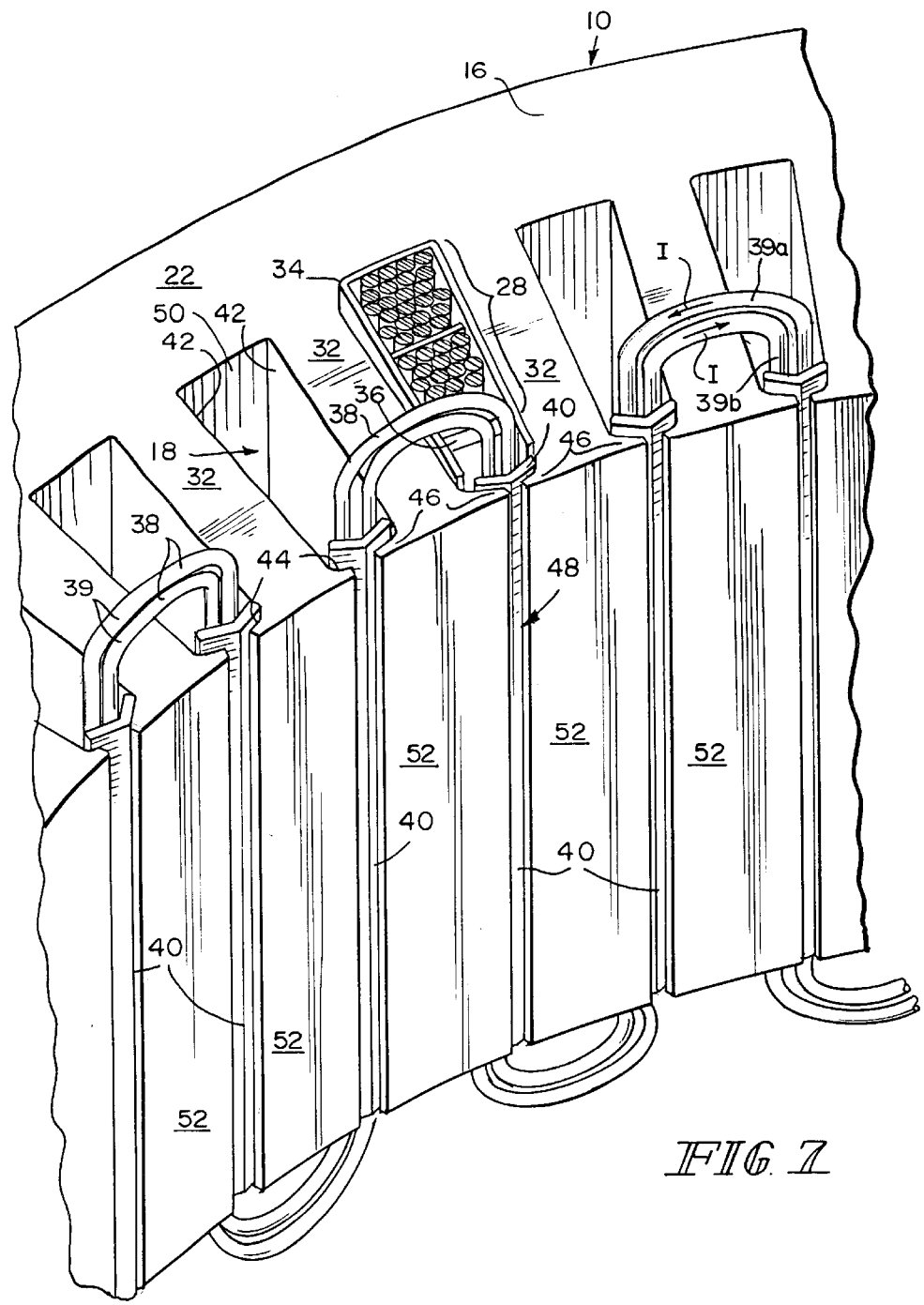
FIG. 7 is a perspective view of the rotor and stator section shown in FIG. 5 with retainers in each of the illustrated armature slots and showing the heater coil wrapped within the armature slots, for clarity the armature windings and insulative sleeve are removed from all but one armature slot.

Referring particularly to FIGS. 1, 3, and 7 the illustrated embodiment of heating element 38 a single, doubled-up continuous wire 39 wound within armature slots 18 and around the inner periphery of stator core 16. For purposes of illustration, doubled-up wire 39 is shown as extending parallel to itself around the periphery of stator core 16. Currents passing through doubled-up wire 39 generate inductances which are effectively cancelled out by the current passing in opposite directions through each branch as shown by arrows I in FIG. 7. In use, especially in motor or generator applications, doubled-up wire may also be twisted so that inductance generated by currents passing therethrough is cancelled. Alternatively, the heating element 38 may be a portion or the whole of the winding 28 itself, excited with aircraft power to produce heat around the air gap.

It should be noted that deicing assembly 30 could be provided as a single assembly which is manufactured having the heating element 38, shield 36, and retainer 40 shown in the Figures laminated or otherwise fabricated into a single structure. For example, a polyimide-based material may be used in combination with a printed wire such as is found in flexible circuits. Such a structure can be formed by manufacturing the heating elements 38 on a polyimide-based retainer 40 and attaching this combination to a thermally and electrically resistive shield 36. The structure can be easily manufactured in a continuous strip having a dimension which allows it to be axially inserted into the corresponding armature slots without interfering with the movement of the rotor 12 relative the stator 10. As noted, such an integral structure would be mounted within the corresponding armature slots 18 disposed between armature winding 28 and air gap 20. Those skilled in the art will recognize that when deicing assembly 30 is used in a rotating machine 6 not including armature windings, such as, for example, a pump 56, deicing assembly 30 is disposed within either rotor 12 or stator 10 in close proximity, and preferably adjacent to air gap 20.

The illustrated system and device also can be formed to provide redundancy to further increase system reliability and decrease the possibility of system failure. In this regard, alternative armature slots 18 may contain portions of a continuous assembly 30. The neighboring alternating armature slots 18 would contain a second continuous assembly 30. In this regard, two separate deicing assembly 30 circuits could be provided. In the event that one circuit fails, the second circuit would be available to accomplish the desired function of the disclosed device and system.

As an additional consideration, the illustrated deicing assembly 30 uses windings or heating elements 38 which have been doubled prior to winding within the armature slot 18 to provide a non-inductive resistor. This doubling of the winding prevents inductance. In other words, if a single heating element was used, current passing through the element would create inductance within the winding. By use of a double winding of the elements 38 the windings of the second element 39b cancels out the inductance created by the windings of the first element 39a. This structure could also be used in the integral or laminated version of the heating assembly 30 within the teaching of the disclosure. In this regard, two continuous circuits having currents passing therethrough in opposite directions can be used to form heating element 38.

The illustrated apparatus includes a heating or deicing assembly 30 which maintains a reduced humidity level or reduces accumulation of humidity and/or ice within the annular air gap 20 between a stator 10 and rotor 12. As might be appreciated, especially in view of the alternate embodiment described hereinabove, the assembly may be a component unto itself which may be integrated into a rotor/stator combination 8. As such, it is anticipated that this apparatus, in the form of the assembly 30 may be a valuable component usable by a variety of rotating machines 6.

The illustrated system embodiment includes a rotor/stator combination 8 employing a deicing assembly 30 as described with regard to the illustrated device embodiment. Deicing assembly 30 may be in the form of a wound assembly 30 as described hereinabove or an integrated form of the assembly. Nevertheless, it is anticipated that rotor/stator combination 8 in combination with the deicing assembly 30 would provide a system used in a rotating machine 6. In the interest of broadly identifying the present invention, the rotating machine 6 employing deicing assembly 30 to provide heat to the air gap 20 may also be considered an illustrated a system embodiment.

The described method embodiment envisions the use of a deicing assembly 30 to provide energy in the form of electrical resistance heating to heat the air in the space identified as air gap 20. The method includes a step of providing the deicing assembly 30. The assembly may be provided in a simplex, duplex or multiplex form so as to provide redundancy in the interest of increasing the reliability and safety factors. Connecting the assembly 30 to an energy source so as to provide energy to maintain a heating function in desired situations. Providing a sensor so as to activate the assembly at a desired temperature or range of temperatures.

Maintaining the assembly in a controllable condition to turn it on and off as necessary as described above to prevent the accumulation of ice within the gap 20.

Although the invention has been described in detail with reference to preferred embodiments, variations and modification exist within the scope and spirit of the invention as described.

What is claimed is:

1. An air gap deicing device for use with a rotating machine having a stationary stator separated by an air gap from a rotating rotor rotating about an axis of rotation extending therethrough in an axial direction, the air gap deicing device comprising:
   a heating element disposed in at least one of the rotor and stator adjacent the air gap; and
   a thermally conductive shield disposed between the heating element and the air gap.

2. The device of claim 1 further comprising a thermal shield disposed between the heating element and a portion of the one of the rotor and stator.

3. The device of claim 1 wherein the one of the rotor and stator is formed to include an aperture extending therethrough in the axial direction and the heating element extends through the aperture.

4. The device of claim 3 wherein the heating element is an electrical resistive heating element.

5. The device of claim 3 wherein the one of the rotor and stator is formed to include a plurality of apertures extending therethrough in the axial direction, a wall adjacent the air gap and a plurality of openings extending through the wall adjacent the air gap, and the heating element extends through the plurality of apertures, wherein each one of the plurality of openings communicates with a different one of the plurality of apertures, and the heating assembly further comprises a plurality of thermally conductive shields wherein each one of the plurality of thermally conductive shields is disposed between the heating element and the opening extending through the wall.

6. A rotating machine comprising a stator, a rotor configured for rotational movement relative to said stator and separated from said stator by an air gap, and an electrically resistive heating element disposed in one of the stator and rotor in thermal communication with the air gap.

7. The rotating machine of claim 6 and further comprising a thermal shield disposed between the heating element and portions of the one of the rotor and stator separated from the air gap by the heating element.

8. The rotating machine of claim 6 and further comprising a thermally conductive element in thermal communication with the heating element and disposed between the heating element and the air gap.

9. The rotating machine of claim 6 wherein the rotor rotates about an axis extending through a body of the rotor and the rotor and stator are disposed coaxially about the axis.

10. The rotating machine of claim 9 wherein the heating element is disposed in the stator.

11. The rotating machine of claim 9 and further comprising a thermal shield disposed between the heating element and portions of the stator separated from the air gap by the heating element.

12. The rotating machine of claim 10 and further comprising a thermally conductive element in thermal communication with the heating element and disposed between the heating element and the air gap.

13. A method of inhibiting ice formation in a rotating machine comprising the steps of:
   providing a rotating machine having coaxially arranged rotor/stator combination including a rotor and a stator defining an air gap therebetween,
   providing an electrically powered resistive heater;
   disposing the provided resistive heater within one of the rotor and stator adjacent the air gap;
   energizing the provided resistive heater.

14. The method of claim 13 and further comprising the steps of providing a temperature sensor adjacent the air gap to sense the temperature of air in the air gap, setting a temperature limit below which the resistive heater will be energized and the energizing step includes energizing the electric heater when the sensed temperature is at or below the selected limit and de-energizing the resistive heater when the sensed temperature is above the selected limit.

15. The method of claim 13 further comprising the steps of providing a second electrically powered resistive heater, disposing the provided second resistive heater within one of the rotor and stator adjacent the air gap and energizing the provided second resistive heater.

* * * * *